(12) United States Patent
Haraguchi et al.

(10) Patent No.: US 8,584,542 B2
(45) Date of Patent: Nov. 19, 2013

(54) LOCK RELEASING MECHANISM

(75) Inventors: Daiki Haraguchi, Toyota (JP); Shoei Shinoda, Toyota (JP); Shinji Okuda, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 528 days.

(21) Appl. No.: 12/602,193

(22) PCT Filed: Jul. 10, 2008

(86) PCT No.: PCT/JP2008/062468
§ 371 (c)(1),
(2), (4) Date: Jan. 8, 2010

(87) PCT Pub. No.: WO2009/011275
PCT Pub. Date: Jan. 22, 2009

(65) Prior Publication Data
US 2010/0170354 A1   Jul. 8, 2010

(30) Foreign Application Priority Data

Jul. 13, 2007   (JP) .................................. 2007-184500
Mar. 3, 2008   (JP) .................................. 2008-052110

(51) Int. Cl.
*F16H 25/08*   (2006.01)
(52) U.S. Cl.
USPC ............................................................. 74/55
(58) Field of Classification Search
USPC ........... 74/55, 89, 404, 405; 297/362, 362.11, 297/376
See application file for complete search history.

(56) References Cited

U.S. PATENT DOCUMENTS

| 4,530,185 | A | * | 7/1985 | Moriya et al. | ................... 49/280 |
| 4,842,313 | A | * | 6/1989 | Boyko et al. | ............. 292/341.16 |
| 5,523,661 | A | * | 6/1996 | Okada et al. | ................... 318/264 |
| 7,500,719 | B2 | | 3/2009 | Kojima | |

(Continued)

FOREIGN PATENT DOCUMENTS

| JP | 7-208008 | 8/1995 |
| JP | 2001-266 | 1/2001 |
| JP | 2007-7386 | 1/2007 |

OTHER PUBLICATIONS

English language Abstract of JP 2001-266, Jan. 9, 2001.

(Continued)

*Primary Examiner* — Vicky Johnson
(74) *Attorney, Agent, or Firm* — Greenblum & Bernstein, P.L.C.

(57) ABSTRACT

There is provided an lock releasing mechanism coupled to a locking mechanism via a cable and configured to be capable of releasing a locked state of the locking mechanism by electrically towing the cable, and an lock releasing mechanism can include a main switch configured to operate manually, a motor configured to be driven by a current passing operation via the main switch, a conversion gear mechanism configured to convert the direction of output of the motor, converting means configured to convert a rotating motion to a reciprocating linear motion, a slider to which the cable is coupled and configured to perform the reciprocating linear motion, and a limit switch configured to be able to pass a current to the motor by a parallel circuit different from a current passage circuit of the main switch. The limit switch is in a current blocking state when the slider is at a neutral position. In contrast, a current passing state is retained while the slider makes one reciprocating motion, and the slider is retained at a full-stroke position for a predetermined period.

7 Claims, 10 Drawing Sheets

(56) References Cited

U.S. PATENT DOCUMENTS

2008/0100115 A1 5/2008 Kojima
2009/0056393 A1 3/2009 Otsuka
2009/0256409 A1 10/2009 Kuroda et al.

OTHER PUBLICATIONS

English language Abstract of JP 2007-7386, Jan. 18, 2007.
English language Abstract of JP 7-208008, Aug. 8, 1995.

* cited by examiner

LOCK RELEASING MECHANISM

TECHNICAL FIELD

The present invention relates to an lock releasing mechanism being coupled to a locking mechanism via a coupling member and being capable of releasing a locked state of the locking mechanism by electrically towing the coupling member.

BACKGROUND ART

As one of the lock releasing mechanisms as described above, there are those disclosed in Patent Document 1 (JP-A-7-208008) and Patent Document 2 (JP-A-2001-266). Strictly speaking, Patent Document 1 is a mechanism which is operated when locking the locking mechanism, but the description will be given assuming that the mechanism is used as an lock releasing mechanism. In Patent Document 1, a main switch, a motor configured to rotate by an current passing operation by the main switch, a conversion gear mechanism configured to convert the direction of rotation output of the motor, converting means configured to convert the rotating motion to the reciprocal swinging motion, a reciprocating member configured to reciprocally swings between a neutral position and a full-stroke position by the converting means, and a spring configured to urge the reciprocating member constantly to the neutral position are provided. The conversion gear mechanism includes a worm gear fixed to a rotating shaft of the motor and a substantially disk-shaped base gear configured to mesh the worm gear. The converting means includes an inertia plate configured to engage the base gear via the spring, a link gear configured to mesh a swing gear, and a clutch pin configured to interlock the link gear with the base gear. The inertia plate is disposed coaxially downwardly of the base gear. The link gear is disposed coaxially above the base gear.

Upon passage of a current the main switch, the base gear rotates via the worm gear of the motor. In conjunction with this, the inertia plate is also rotated by the spring. Accordingly, the clutch pin projects into a circumferential groove between the base gear and the link gear. Then, the clutch pin engages an engaging projection of the link gear, whereby the link gear is rotated. Upon the rotation of the link gear, the swing gear swings in the lateral direction, so that the coupling member coupled to the swing gear is towed to lock (unlock) the locking mechanism. A series of motions is achieved by a power source being supplied from the main switch to the motor for a sufficient predetermined period, and the limit of the swinging motion of the swing gear is defined by a stopper. When the motor is stopped, the inertia plate is restored to the neutral position by the spring which urges in the direction of reverse rotation. At this time, the clutch pin is stored in the base gear, and the engagement with the engaging projection is released. Accordingly, the interlocked relationship between the base gear and the link gear is released.

In Patent Document 2, a main switch configured to perform the current passing operation when releasing the locked state of the locking mechanism, an actuator having a drive shaft projecting and retracting upon current passage via the main switch, transmitting means configured to reciprocally swing between a neutral posture and a full-stroke posture upon receipt of an output from the actuator, an urging member configured to constantly urge the transmitting means to the neutral posture, and two limit switches which forcedly stop the actuator are provided. The transmitting means employed here includes an actuating arm configured to swing in association with the activation of the actuator, and a locking member configured to lock the swinging motion of the actuating arm.

When the actuator is actuated to project upon receipt of the operation of the main switch, the actuating arm swings to the full-stroke posture, so that the coupling member is towed and the locking mechanism is unlocked. When the actuating arm assumes the full-stroke posture, the locking member comes into abutment with a first limit switch. Accordingly, the actuator is forcedly stopped even though the main switch is continuously pushed. When the operation of the main switch is released, the actuator is operated to be retracted. In conjunction with this, the actuating arm is swung to restore the neutral posture, and the locking mechanism is brought again into the locked state. When the actuating arm assumes the neutral posture, the locking member comes into abutment with a second limit switch, so that the actuator is forcedly stopped.

In Patent Document 1, the main switch must be pushed continuously until the locked state of the locking mechanism is completely released, so that the operation of the locking mechanism is complicated. In other words, when the operation of the main switch is released in the course of the operation of the locking mechanism, the locked state of the locking mechanism cannot be released. In addition, in order to retain the swing gear at the full-stroke position, the main switch must be continuously pushed. The limit of the swinging motion of the swing gear is retained by the stopper. In this configuration, since the power source is continuously supplied to the motor while the swing gear is retained at the full-stroke position, an unnecessary load is applied to the motor, so that there is apprehension that the motor is subjected to damages or early deterioration. In contrast, in Patent Document 2, even when the main switch is continuously pushed, the actuator can be stopped forcedly by the first limit switch, so that the unnecessary load is not applied to the actuator. In a case of releasing the operation of the main switch and returning from the full-stroke posture to the neutral posture, the actuator is stopped by the second limit switch in the neutral posture. However, even in Patent Document 2, the main switch must be pushed continuously until the locked state is completely operated to the unlocked state, and in order to retain the locked state. In other words, when the operation of the main switch is released in the course of the operation of the locking mechanism, the locked state cannot be released. In the first place, bringing the reciprocating member into the reciprocating motion only by one-push operation such as to push the main switch once and release immediately is substantially impossible because the actuator (solenoid) configured so that the drive shaft is actuated in the retracting direction upon release of the operation of the main switch is employed. Suppose it is possible, increase in complexity of the mechanism is inevitable.

This specifically presents a problem in a locking mechanism which is required to continue the unlocked state to some extent. For instance, a case where the lock releasing mechanism is coupled to the locking mechanism of an electric reclining mechanism in a power seat for a vehicle is exemplified. A seatback of the power seat is configured to be electrically adjustable in reclining angle by operating a main switch disposed at an adequate position in the vehicle. Therefore, the unlocked state needs to be retained at least for the duration of the operation of the reclining angle of the power seat. However, with the lock releasing mechanism as disclosed in Patent Document 1 and Patent Document 2, the full-stroke position in which the coupling member is towed cannot be retained unless the main switch is continuously pushed. In this configuration, the operation to move the power seat from the fully reclined state to a basic posture, then to a folded state beyond the basic posture cannot be achieved only by the one-push operation such as to push the main switch once and release immediately.

Thus, there is a need in the art for a lock releasing mechanism in which an actuated state is continued for a predetermined period even after the current passing operation via the main switch is immediately released, and a full-stroke position in which a coupling member is towed can be retained.

SUMMARY

An lock releasing mechanism according to the present invention includes a main switch configured to perform a current passing operation when releasing a locked state of a locking mechanism; a motor configured to generate a rotation output by the current passing operation via the main switch; a conversion gear mechanism configured to convert the direction of rotation output of the motor; converting means configured to convert the rotation output to a reciprocating linear motion upon receipt of a conversion output from the conversion gear mechanism; a reciprocating member to which a coupling member is coupled and configured to linearly reciprocate between two positions of a neutral position in which the locking mechanism is in the locked state, and a full-stroke position in which the coupling member is towed to release the locked state of the locking mechanism by the converting means; and a limit switch configured to be able to pass a current to the motor by a parallel circuit different from a current passage circuit of the main switch. The conversion gear mechanism includes a worm gear fixed to a rotating shaft of the motor and a base gear configured to mesh the worm gear. The limit switch is in a current blocking state when the reciprocating member is at the neutral position. While the reciprocating member makes one reciprocating motion between the two positions by the current passing operation via the main switch, the current passing of the limit switch is retained. Also, the invention is characterized in that the reciprocating member is retained for a predetermined period at the full-stroke position while the reciprocating member makes one reciprocating motion between the two positions. If the current passing state of the limit switch is retained is retained while the reciprocating member makes one reciprocating motion between the two positions, the main switch may either be in the current passing state or the current blocking state.

The converting means may be configured to include pressing means configured to rotate integrally with the base gear about the same center of rotation, and receiving means configured to come into abutment with the pressing means and move integrally with the reciprocating member. In this case, by the receiving means pressed in association with the rotation of the pressing means, the reciprocating member is moved from the neutral position to the full-stroke position. When the pressing force of the pressing means is released, the reciprocating member is returned from the full-stroke position to the neutral position. An outer peripheral surface in terms of the radial direction of a rotation locus of the pressing means is formed into an arcuate surface in the shape of a concentric circle with respect to the base gear. Accordingly, the invention is characterized in that the reciprocating member is retained for a predetermined period at the full-stroke position while the arcuate surface of the pressing means is in sliding contact with the receiving means. Conversely, when the reciprocating member is at a position other than the full-stroke position including the neutral position, the arcuate surface of the pressing means is not in abutment with the receiving means. At this time, the pressing means may be in abutment with the receiving means at a portion other than the arcuate surface or both of them may be apart from each other. In other words, the pressing means and the receiving means do not necessarily have to be constantly in abutment or in sliding contact with each other. The pressing means may be formed integrally with the base gear, or may be formed separately. In the same manner, the receiving means may be formed integrally with the reciprocating member, or may be formed separately. Also, the shapes and the positions of arrangement of the pressing means and the receiving means are not specifically limited except for the arcuate surface of the pressing means as long as the both are in positions which allow abutment with respect to each other, and move integrally with the base gear and the reciprocating member.

Furthermore, the lock releasing mechanism of the present invention may include a cam mechanism configured to rotate integrally and coaxially with the base gear, and be able to perform the current passing operation with respect to the limit switch by coming into and out of contact with the limit switch. In this case, the limit switch is preferably brought into the current passing state only while the cam mechanism makes one revolution upon receipt of the output of the motor by the current passing operation via the main switch. The case in which the cam mechanism rotates upon receipt of the output of the motor includes various patterns depending on the cam mechanism or other components, and the cam mechanism may receive the output of the motor directly or may receive indirectly via other members or mechanisms. Also, since the limit switch is in the current passing state only while the cam mechanism makes one revolution, the cam mechanism makes one revolution while the reciprocating member makes one reciprocating motion between the two positions by the output of the motor.

The cam mechanism is preferably configured to be capable of coming into abutment partly with the limit switch. In this case, in the neutral state before causing the main switch to perform the current passing operation, the limit switch and a part of the cam mechanism are brought into abutment, or the limit switch and the cam mechanism are brought apart from each other, so that the limit switch is in the current blocking state. When the cam mechanism is rotated upon receipt of the output of the motor by the current passing operation via the main switch, the limit switch and the cam mechanism is moved apart from each other, or the limit switch and a part of the cam mechanism are brought into abutment with each other to assume the current passing state. In other words, the cam mechanism does not necessarily perform a switching operation in a state of being constantly in contact with the limit switch. In a certain condition, the part of it is in press contact with the limit switch. In another condition, it does not in contact with the limit switch at all. In this manner, the switching operation is performed by the change of the state of being in or out of contact between the limit switch and the cam mechanism. The part of the cam mechanism which comes into abutment with the limit switch includes a case of being a limited small part of the entire cam mechanism, and a case of being most part of the entire cam mechanism.

By configuring the cam mechanism in this manner, when the cam mechanism starts rotating upon receipt of the output of the motor once, the current passing state of the limit switch is retained. Therefore, even when the current passing operation via the main switch is stopped immediately, the motor continues to be driven for a certain period. In association with this, the cam mechanism also continues to rotate. Then, when the cam mechanism makes one revolution and the relative relationships between the limit switch and the cam mechanism into an initial state, the lock releasing mechanism is automatically brought into the current blocked state, and is stopped.

The lock releasing mechanism configured in this manner can be used adequately for unlocking the reclining mechanism of the power seat for the vehicle. More specifically, the coupling member is coupled to the locking mechanism of the electric reclining mechanism of the power seat for the vehicle. In this state, the reciprocating member is preferably retained at the full-stroke position for a period at least longer than that required for electrically operating the power seat from the fully reclined state to a free lock state.

It is also possible to couple a towing member which allows manual towing of the reciprocating member to the full-stroke position to the reciprocating member and allow the coupling member to be selectively towed electrically or manually. In this case, the towing member is preferably coupled so as not to be overlapped with the conversion gear mechanism.

ADVANTAGE OF THE INVENTION

The lock releasing mechanism according to the present invention is configured to allow the passage of the current to the motor not only via the current passage circuit of the main switch, but also the parallel circuit in which the limit switch is disposed. The current passing state to the motor is retained by the limit switch while the reciprocating member makes one reciprocating motion. Accordingly, an independent power source supply via the limit switch is ensured without being affected by the current passing and current blocking operation via the main switch only when the motor is activated by performing the current passing operation via the main switch once. Therefore, granted that the current passing operation via the main switch is stopped immediately, the lock releasing mechanism can be continuously in action while the reciprocating member makes one reciprocating motion. Therefore, it is not necessary to continuously push the main switch until the locking mechanism is brought into the unlocked state. Since the mechanism as described thus far includes the conversion gear mechanism configured to convert the direction of rotation output of the motor and the converting means configured to convert the conversion output of the conversion gear mechanism into the reciprocating linear motion of the reciprocating member after having employed the motor as the driving means, the above described advantages are achieved in a simple configuration. In addition, since the reciprocating member is retained for the predetermined period at the full-stroke position during one reciprocating motion of the reciprocating member, the locking mechanism can be reliably unlocked only by the one-push operation of the main switch and, furthermore, the unlocked state of the locking mechanism can be retained for the predetermined period.

If the converting means includes a pressing projection having the outer peripheral surface formed in the arcuate shape and the receiving portion, and the reciprocating member is retained at the full-stroke position for the predetermined period while the arcuate surface of the pressing projection is in sliding contact with the receiving portion, the period of retaining the reciprocating member at the full-stroke position can be easily designed only by adjusting the length of the arcuate surface f the pressing projection adequately. In addition, since the motor is continuously rotated while the reciprocating member is retained at the full-stroke position, an unnecessary load is not applied to the motor.

If the cam mechanism which performs the current passing and current blocking operations by coming into and out of contact with the limit switch is configured to rotate upon receipt of the output of the motor, the conversion gear mechanism and the cam mechanism commonly use the single motor, and hence the efficient actuating mechanism is achieved while preventing increase in number of components. Also, by causing the cam mechanism to rotate integrally with the base gear, it is not necessary to take the trouble to operate the cam mechanism, so that the power source supply to the motor can be retained easily and reliably. Since the period of power source supply by the limit switch is adjusted so that the reciprocating member makes one reciprocating motion while the cam mechanism makes one revolution on this basis, the unlocking operation of the locking mechanism by the lock releasing mechanism is achieved efficiently. In other words, the unnecessary motion such that the unlocking operation is performed unintentionally by a plurality of numbers of times by one switching operation or the inconvenience of stopping the power source supply before unlocking operation is performed does not occur.

When the current passing and current blocking operations of the limit switch so as to bring the limit switch and the cam mechanism into and out of contact with respect to each other in association with the rotation of the cam mechanism are performed only by the change of the state of coming into and out of contact with the cam mechanism, reliable operation is achieved without employing a complicated mechanism.

If the coupling member is coupled with the locking mechanism of the electric reclining mechanism of the power seat for the vehicle and the reciprocating member is retained at the full-stroke position at least for a period longer than that required for the power seat to be electrically operated from the fully reclined state to the free lock state, the reclining angle can be adjusted reliably by the one-push operation of the main switch.

Also, if the locked state of the locking mechanism can be released by selectively towing the coupling member not only electrically but also manually, the usability of the lock releasing mechanism is improved. At this time, if the towing member for manual towing is directly coupled to the reciprocating member, the number of components of the lock releasing mechanism can be minimized, so that the simple configuration is achieved. Also, when the towing member is coupled so as not to be overlapped with the conversion gear mechanism, the possibility of attachment of lubricating agent such as grease applied on the worm gear or the base gear to the towing member is eliminated or reduced.

BEST MODE FOR CARRYING OUT THE INVENTION

Hereinafter, embodiments of an lock releasing mechanism will be described. However, the lock releasing mechanism is not limited thereto, and various modifications are possible within a scope in which the gist of the lock releasing mechanism is not modified. Although the lock releasing mechanism is applicable to various locking mechanisms, it is suitable for a power seat for vehicles such as automotive vehicles among others. Among the power seats, the lock releasing mechanism is suitable for an electric reclining mechanism. Among the reclining mechanisms, the lock releasing mechanism is suitable for an internal gear type locking mechanism.

Figure 1:
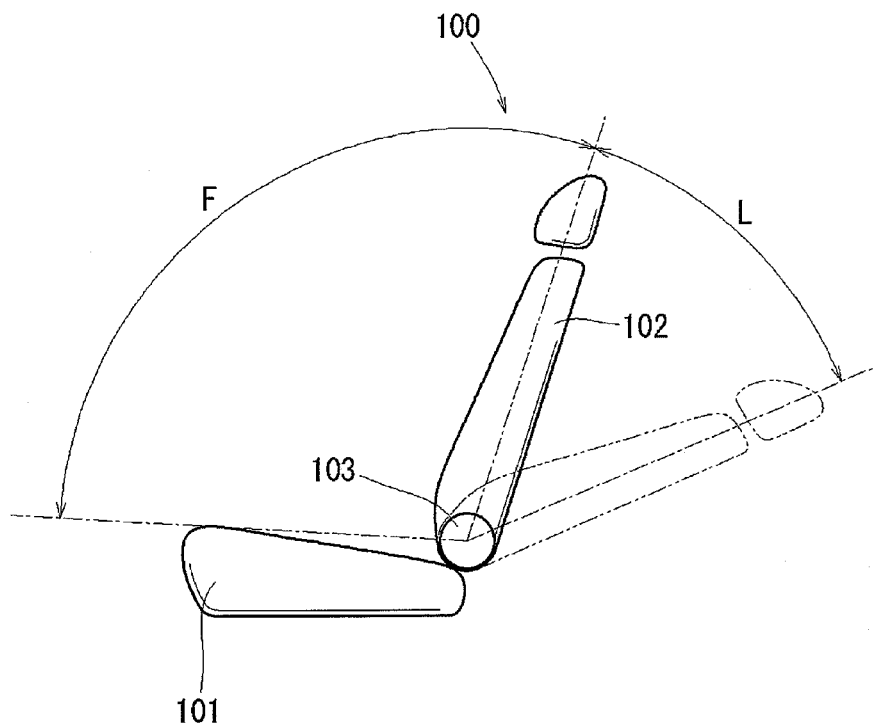
FIG. 1 is a side view of a vehicle seat.

As shown in FIG. 1, a power seat 100 of this type is configured in such a manner that a reclining angle of a seatback 102 can be adjusted electrically by a pressing operation of an electric switch (not shown). The electric switch is arranged outside of a seat cushion 101. In a reclining mechanism 103, a lock zone L extends between a fully reclined posture (a posture shown by an imaginary line in FIG. 1) and a basic posture (a posture shown by a solid line in FIG. 1). In the lock zone L, a reclined state can be retained by locking with the locking mechanism, and the reclining angle can be electrically adjusted. In the fully reclined posture, the seatback 102 is reclined towards the back of the vehicle to a large extent. In the basic posture, the seatback 102 stands upright on the seat cushion 101. In contrast, a free lock zone F extends from the basic posture to a stored posture. The free lock zone F is not locked by the locking mechanism and is a zone in which the reclining angle cannot be electrically adjusted. In the stored posture, the seatback 102 is folded on the seat cushion 101 toward the front of the vehicle. An internal gear type locking mechanism 110 as shown in FIG. 2 is used as the reclining mechanism 103.

Figure 2:
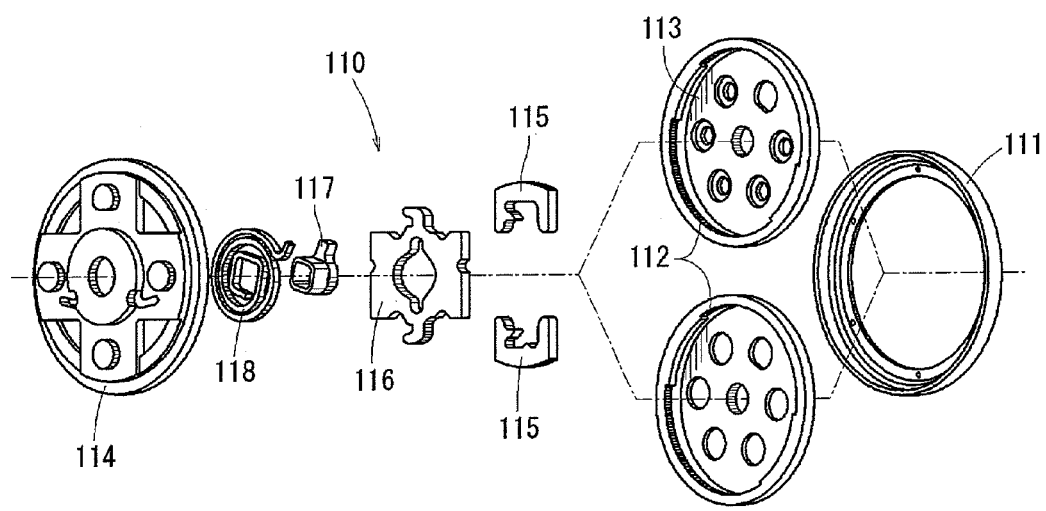
FIG. 2 is an exploded perspective view of a locking mechanism of a reclining mechanism.

In FIG. 2, the internal gear type locking mechanism 110 is fixed to a bracket 111 on the side of a seatback, and includes a seatback-side housing 113 having an internal gear 112 in the inner side thereof, and a lock gear 115 configured to mesh the internal gear 112 by being supported by a seat-cushion-side bracket 114 and moving inward and outward in the radial direction. The inward and outward movement of the lock gear 115 is performed by a towing operation of an operating member 117 integrated therein via a cam plate 116 with a cable coupled thereto. In a locked state (initial state) before adjusting the reclining angle, the lock gear 115 is pressed by the cam plate 116 from the inside to the outside and hence is meshed with the internal gear 112, so that the lock gear 115 is locked by the seatback-side housing 113. In order to adjust the reclining angle from this locked state, the cable is towed against the urging force of a balance spring 118 to rotate the operating member 117, and then the cam plate 116 is rotated correspondingly, so that the pressing force of the lock gear 115 is released. Accordingly, meshing between the lock gear 115 and the internal gear 112 is released, and the reclining mechanism is brought into an unlocked state, so that the adjustment of the reclining angle of the vehicle sheet is enabled.

Although not shown, the locking mechanism 110 and the lock releasing mechanism are coupled with the intermediary of the cable as coupling means in the interior of the power seat 100. The lock releasing mechanism is coupled to a power switch disposed outside or the like of the power seat 100 with an electric cable. When the power switch is pressed, the lock releasing mechanism having received a power source supply via the electric cable is activated, and hence the cable is towed, so that the locking mechanism 110 is released. Therefore, while the reclining angle of the power seat 100 is adjusted, it is necessary to retain the locking mechanism 110 in the unlocked state by retaining a towed state of the cable. Then, the lock releasing mechanism attracts public attention in that the lock releasing mechanism is continuously in action for a predetermined period by pushing the power switch once even though the power switch is not continuously pushed and the state in which the cable is towed can be continuously retained for a predetermined period. The power switch corresponds to a main switch of the lock releasing mechanism.

An lock releasing mechanism 1 will be described in detail while presenting detailed embodiment. In that case, the directions such as up and down, left and right are described with reference to the direction illustrated in the drawings as needed. However, these are simply the directions convenient for description and the directions are not limited thereto as long as the relative positional relationship of the respective members are within the range of the illustrated state.

First Embodiment

A first embodiment of the lock releasing mechanism 1 is shown in FIG. 3 to FIG. 9. The lock releasing mechanism 1 may be an lock releasing mechanism by being constructed within a casing formed into a predetermined shape, or may be constructed directly on a board member such as the power seat. In this specification, these members are not specifically discriminated, and the bottom surface of the casing or the board member is shown as a substrate. In this specification or the drawings, the description and illustration are given in a state in which the lock releasing mechanism 1 is constructed on the substrate arranged horizontally. However, the lock releasing mechanism is not limited thereto, and the lock releasing mechanism 1 may be constructed on a side surface of the substrate arranged vertically or obliquely, or may be constructed on a lower surface of the horizontal substrate. In other words, it is also possible to be mounted on a vehicle seat or the like in a state of upside down or of raised vertically while remaining the state illustrated in the respective drawings.

Figure 3:
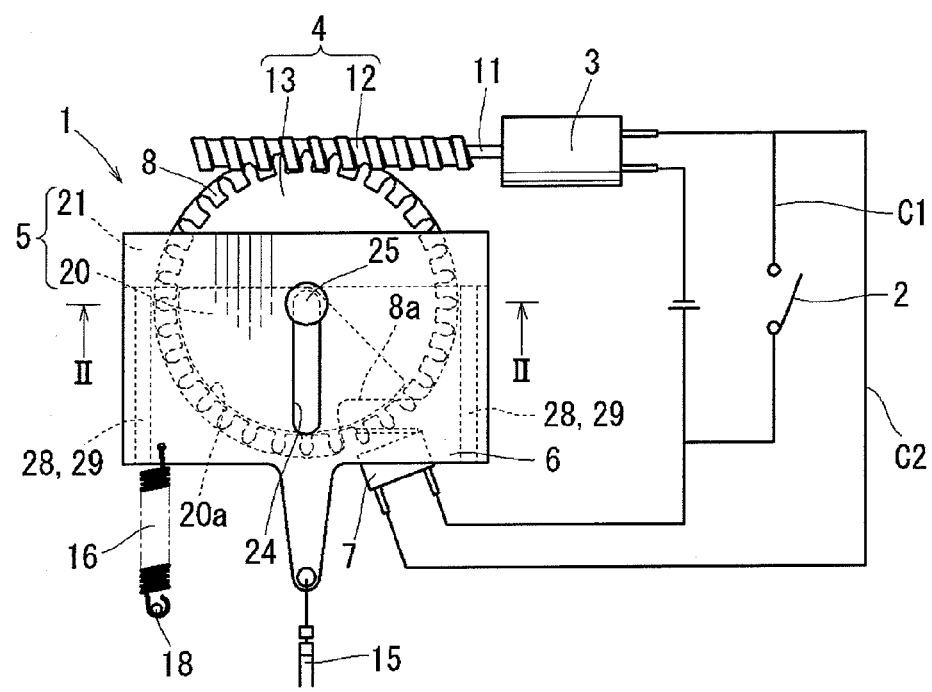
FIG. 3 is a plan view of an lock releasing mechanism according to a first embodiment.

FIG. 3 is a plan view showing an initial state of the lock releasing mechanism 1 conceptually illustrating an electric circuit. As shown in FIG. 3, the lock releasing mechanism 1 includes a main switch 2 configured to perform a current passing operation manually via a circuit C1 when releasing the locked state of the locking mechanism; a motor 3 configured to generate a rotation output by being supplied with a power source by the current passing operation via the main switch 2; a conversion gear mechanism 4 configured to convert the direction of rotation output of the motor 3; converting means 5 configured to convert a rotating motion to a reciprocal linear movement upon receipt of a conversion output from the conversion gear mechanism 4; a slider 6 configured to linearly reciprocate between two positions of a neutral position and a full-stroke position; a limit switch 7 configured to be able to pass a current to the motor 3 via a circuit C2 different from the circuit C1 of the main switch 2, and a cam mechanism 8 configured to perform the current passing operation with respect to the limit switch 7. The circuit C1 of the main switch 2 and the circuit C2 of the limit switch 7 are wired as a parallel circuit.

Figure 4:
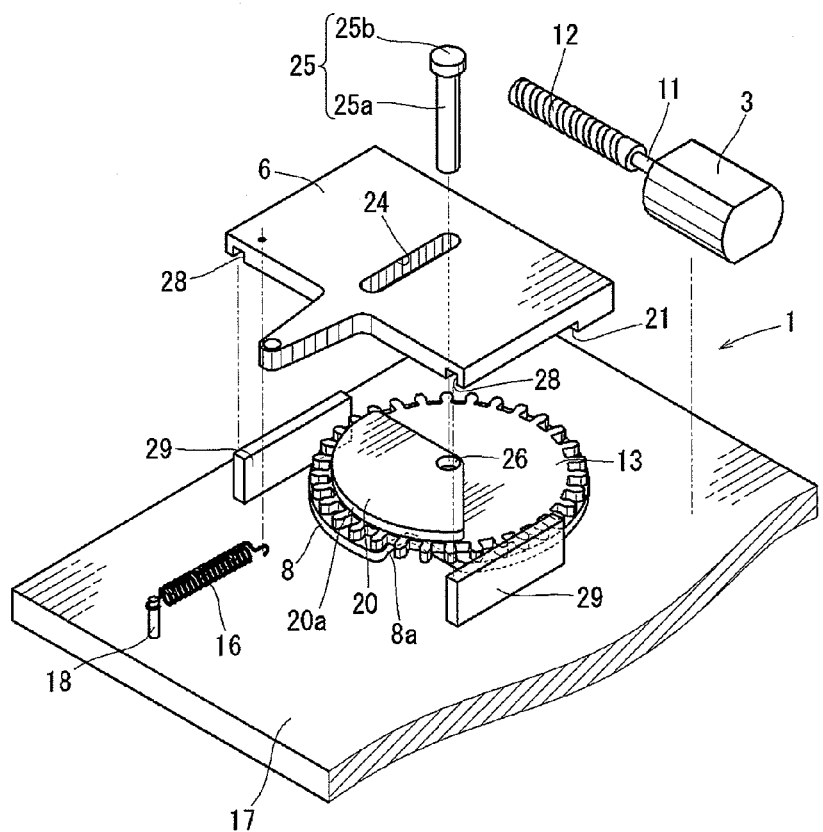
FIG. 4 is an exploded perspective view of the lock releasing mechanism according to the first embodiment.

Referring also to FIG. 4, further detailed description will be given below. The slider 6 is a substantially plate shaped member. A cable 15, one of the ends of which is coupled to the locking mechanism, is coupled to a distal end of the slider 6 on the side of the neutral position. When the slider 6 is at the neutral position shown in FIG. 3, the locking mechanism is in the locked state. When the slider 6 is at the full-stroke position shown in FIG. 7 and FIG. 8, the locking mechanism is brought into the unlocked state by the cable 15 being towed. The slider 6 corresponds to a reciprocating member, and the cable 15 corresponds to a coupling member. When the slider 6 is at a position displaced from the neutral position toward the full-stroke position, the cable 15 receives an urging force in the direction toward the neutral position (locking direction) from the locking mechanism. Therefore, the cable 15 also functions as an urging member of the slider 6. A neutral spring 16 is locked between a portion of the slider 6 on the neutral side and a pin 18 projecting upright from a substrate 17. The neutral spring 16 functions as auxiliary urging member which constantly urges the slider 6 toward the neutral position in cooperation with the cable 15.

The conversion gear mechanism 4 includes a worm gear 12 fixed to a rotating shaft 11 of the motor 3, and a base gear 13 which meshes with the worm gear 12. The base gear 13 has a flat disk shape formed with gear teeth on the outer peripheral surface. The rotation output of the motor 3 is converted into the rotation output in the direction of an axis of rotation at a right angle with respect to the direction of the axis of rotation thereof by the conversion gear mechanism 4. In other words, the worm gear 12 and the base gear 13 of the motor 3 mesh with each other in an index parallel cam mode. In the first embodiment, a vertical rotation of the worm gear 12 which receives the rotation output of the motor 3 directly is converted into an output of a horizontal rotation by the base gear 13 which meshes therewith. The worm gear 12 has a sufficient length to transmit the rotation output of the motor 3 reliably to the conversion gear mechanism 4 also from a position apart therefrom to a certain extent.

The converting means 5 includes a fan-shaped pressing projection 20 formed integrally on the upper surface of the base gear 13, and a receiving projection 21 formed integrally downward from the lower surface of a full-stroke side line across both the left and right ends of the slider 6. Accordingly, the pressing projection 20 rotates integrally and orbitally with the base gear 13 about the same center of rotation, and the receiving projection 21 moves integrally with the slider 6. The outer peripheral surface in the radial direction (the radial direction of the base gear 13) in a rotation locus of the pressing projection 20 forms an arcuate surface 20a extending concentrically along the outer peripheral surface of the base gear 13.

The cam mechanism 8 is integrally formed on the lower surface of the base gear 13, and is configured with a plate disk shaped plate cam having the same diameter as the base gear 13. More specifically, a depression 8a is formed on part of the outer peripheral surface of a plate cam 8 so as to be depressed radially inwardly and, as shown in FIG. 3, when the plate cam 8 is in a neutral posture, the limit switch 7 faces inside the depression 8a, so that the limit switch 7 and the plate cam 8 are apart from each other. In contrast, when the plate cam 8 rotates integrally and coaxially with the base gear 13 upon receipt of the rotation output of the motor 3, the limit switch 7 comes into sliding contact with the outer peripheral surface of the plate cam 8 other than the depression 8a. In this manner, the plate cam 8, the base gear 13, and the pressing projection 20 are formed into a respectively integrated single base member.

Figure 5:
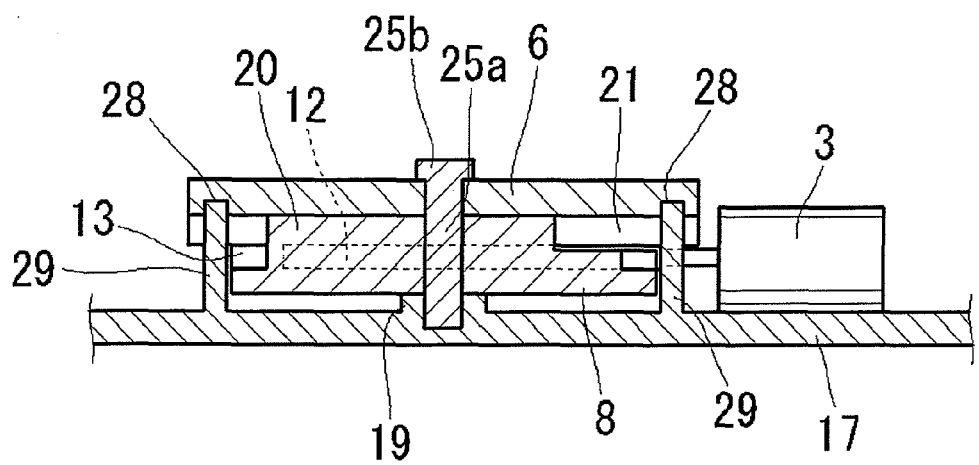
FIG. 5 is a cross-sectional view taken along a line II-II in FIG. 3.

The slider 6 is formed at the laterally center thereof with a sliding groove 24 elongated in the fore-and-aft direction (the direction extending through the neutral position and the full-stroke position) so as to penetrate therethrough in the direction of the thickness thereof. As shown in FIG. 5, the slider 6 can be assembled above the base gear 13 by inserting a locking pin 25 into a boss 19 of the substrate 17 through the sliding groove 24 and a locking hole 26 formed at a center of the base gear 13 (a top portion of the pressing projection 20) from above. Since a pin portion 25a of the locking pin 25 is formed slightly smaller than the width of the sliding groove 24, the slider 6 is freely slidable reciprocally in the fore-and-aft direction about the locking pin 25 as a fulcrum. In contrast, since a top portion 25b of the locking pin 25 is larger than the width of the sliding groove 24, the slider 6 is prevented from coming off and being disconnected.

In FIG. 3 to FIG. 5, the slider 6 is formed with depressed guiding grooves 28, 28 at laterally both sides of the lower surface thereof so as to extend from the end on the side of the neutral position to the receiving projection 21, and the substrate 17 is integrally formed with guiding strips 29, 29 at laterally both sides of the base gear 13 on the upper surface thereof so as to extend in the fore-and-aft direction. The lateral width of the guiding groove 28 is slightly larger than the lateral width of the guiding strip 29, and the guiding grooves 28 slidably engage the guiding strips 29 when the slider 6 is assembled to the base gear 13. Also, as well shown in FIG. 5, the height of the guiding strip 29 is designed in such a manner that when the slider 6 is assembled to the base gear 13, the slider 6 is received by the guiding strips 29 in the guiding grooves 28, and hence at least the slider 6 and the pressing projection 20 do not come into tight contact with each other. Also, the projecting dimensions of the pressing projection 20 and the receiving projection 21 are substantially the same.

Figure 6:
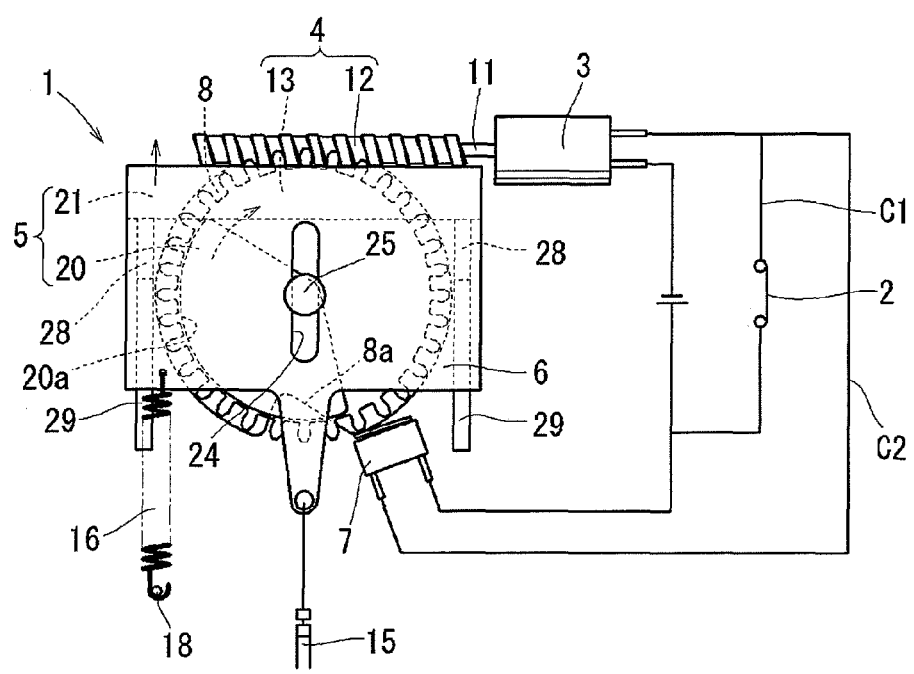
FIG. 6 is a plan view of a state in which a slider according to the first embodiment is at an initial position.

In this manner, the state shown in FIG. 3 is a neutral state before the unlocking operation is performed on the locking mechanism. In other words, this state is the initial state, and the limit switch 7 is in a current blocking state which is a state of facing the depression 8a of the plate cam 8, and the slider 6 is at the neutral position and hence a towing force does not act on the cable 15, so that the locking mechanism is in the locked state. The pressing projection 20 is faced leftward, and a flat side surface of the pressing projection 20 comes into abutment with the receiving projection 21 of the slider 6. Also, the receiving projection 21 and the left and right guiding strips 29 are also in abutment with each other. Subsequently, referring to FIG. 6 to FIG. 8, a series of actuating mechanism of the lock releasing mechanism 1 will be described. When a current passing operation is performed via the main switch 2 from the initial state shown in FIG. 3 (neutral state), a power source is supplied through the circuit C1, and the motor 3 is rotated. By the rotation output of the motor 3, the base gear 13 which meshes with the worm gear 12 rotates clockwise as shown in FIG. 6, and the vertical rotation of the motor 3 is converted into the horizontal rotation. In association with this, the plate cam 8 integrally formed with the base gear 13 also rotates synchronously in the same direction with the base gear 13. Then, the limit switch 7 is brought into press contact with the outer peripheral surface of the plate cam 8 and hence assumes the current passing state, and the power is supplied also from the circuit C2. In other words, in an initial stage of movement immediately after the unlocking operation shown in FIG. 6, the current is passed to the motor 3 both from the circuit C1 of the main switch 2 and the circuit C2 of the limit switch 7. Also, in association with the rotation of the base gear 13, the pressing projection 20 also rotates orbitally and synchronously about the top portion at the axis of rotation of the base gear 13. Then, the receiving projection 21 in abutment with the pressing projection 20 is pressed toward the full-stroke position, so that the slider 6 slides toward the full-stroke position against the urging force of the neutral spring 16 about the locking pin 25 in the sliding groove 24 as the fulcrum point and the cable 15 is started to be towed. At this time, since the guiding grooves 28 engage the guiding strips 29, the slider 6 is able to slide smoothly without rattling to the front, rear, left and right.

Figure 7:
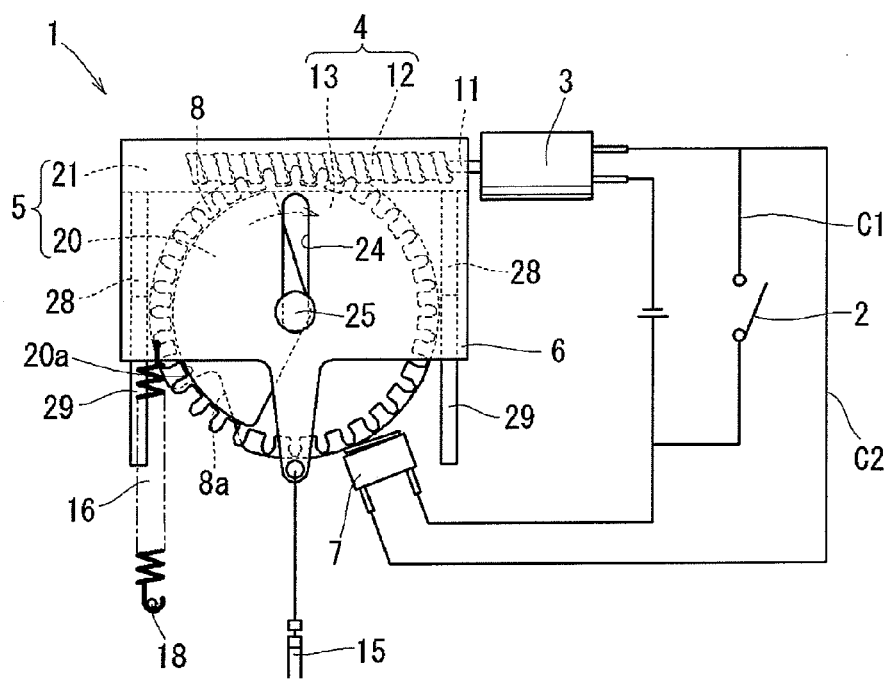
FIG. 7 is a plan view of a state in which the slider according to the first embodiment is at a full-stroke position.
Figure 8:
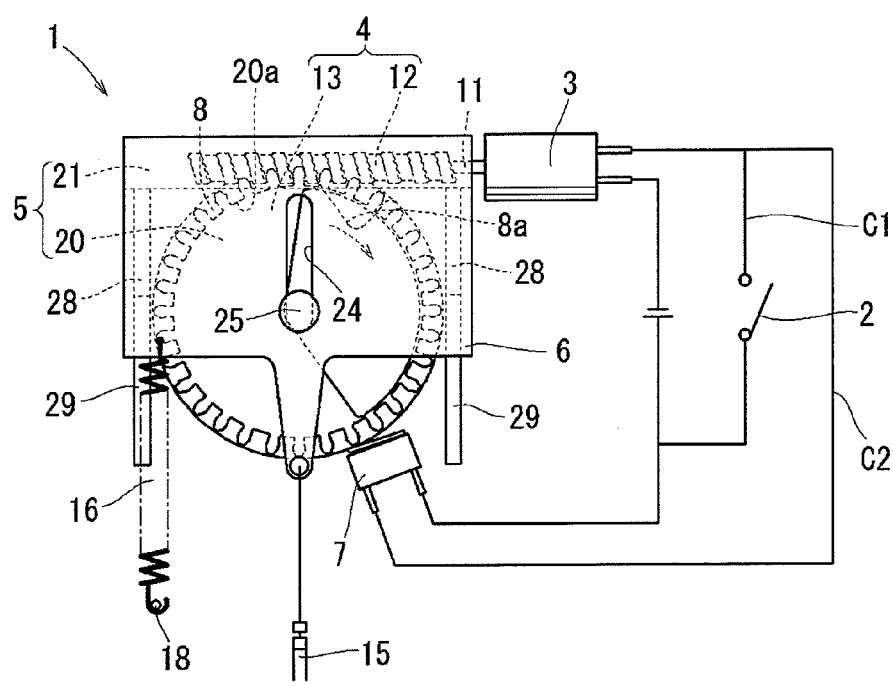
FIG. 8 is a plan view of a state in which the slider according to the first embodiment is retained at the full-stroke position.

When the state shown in FIG. 6 is assumed, the current passing state of the circuit C2 is retained, and hence the lock releasing mechanism 1 is continuously in action even when the current passing operation via the main switch 2 is stopped thereafter as shown in FIG. 7 and FIG. 8. Then, when a positional state in which the arcuate surface 20a of the pressing projection 20 shown in FIG. 7 is brought into abutment with the receiving projection 21 is assumed, the slider 6 comes to the full-stroke position at the slide limit. In association with this, the cable 15 is also towed significantly, and hence the locked state of the locking mechanism is released. Although the locking pin 25 is at the rear end in the sliding direction of the sliding groove 24 (the end on the side of the neutral position) when the slider 6 is at the full-stroke position in the first embodiment, it may be positioned at the midsection of the sliding groove 24. From this context, the length of the sliding groove 24 is the same or larger than the radius of a rotation locus circle of the pressing projection 20. Subsequently, as well shown in FIG. 8, while the arcuate surface 20a of the pressing projection 20 is in sliding contact with the receiving projection 21, the slider 6 is maintained at the full-stroke position for the predetermined period. Accordingly, the locked state of the locking mechanism is maintained for the predetermined period, the reclining mechanism of the power seat 100 can be reliably and electrically adjusted. By adjusting the length of the arcuate surface 20a of the pressing projection 20 as needed, the period of retaining the unlocked state can also be changed.

Figure 9:
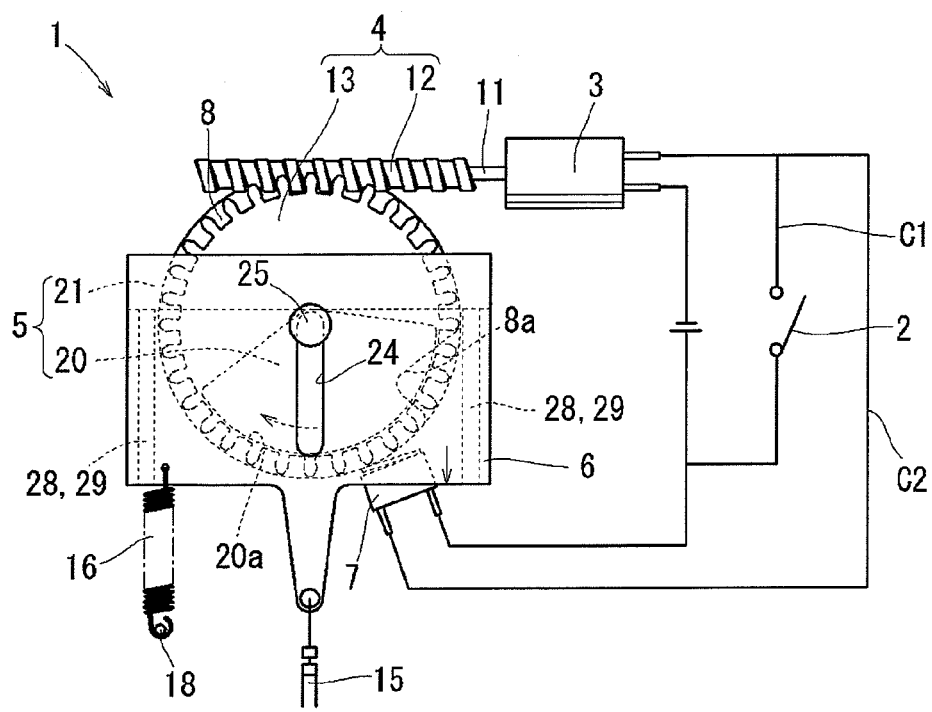
FIG. 9 is a plan view of a state in which the slider according to the first embodiment is returned to a neutral position.
Figure 10:
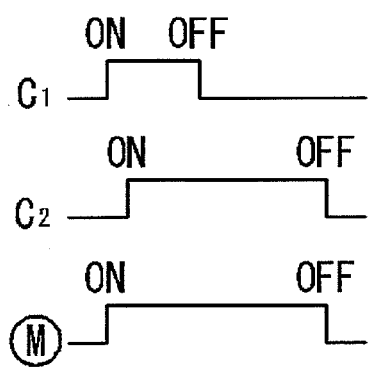
FIG. 10 is a conceptual drawing showing an actuation timing of a motor, a main switch, and a limit switch.

When the pressing projection 20 is further rotated from the state shown in FIG. 8, the pressing force of the pressing projection 20 is released, and the slider 6 is returned to the neutral position by the urging forces of the cable 15 and the neutral spring 16 as shown in FIG. 9, so that the locking mechanism is locked. At this time, the receiving projection 21 comes into abutment with the guiding strips 29, so that the neutral position of the slider 6 is defined. Then, when the plate cam 8 makes one revolution and returns to the initial state shown in FIG. 3 again, the limit switch 7 faces the depression 8a of the plate cam 8 again and the current to the circuit C2 is blocked, so that the motor 3 is stopped and the lock releasing mechanism is stopped automatically in the neutral state. In this manner, as shown in FIG. 10, when the current passing operation is performed via the main switch 2 (the circuit C1) once, the limit switch 7 (the circuit C2) is also brought into the current passing state correspondingly, and hence the motor 3 is continuously in action even though the current passing operation via the main switch 2 (the circuit C1) is stopped immediately thereafter. Reference sign M in FIG. 10 designates the motor. Then, the current passing state of the limit switch 7 (the circuit C2) is retained while the plate cam 8 makes one revolution, and when it is returned to the initial state again, it assumes the current blocking state automatically, and hence the motor M (the lock releasing mechanism 1) is stopped. Accordingly, since the lock releasing mechanism 1 is continuously in action reliably while the slider 6 makes one reciprocating motion, the locking mechanism can be released reliably without pushing the main switch 2 for a long time and the unlocked state can be retained for the predetermined period.

Second Embodiment

Figure 11:
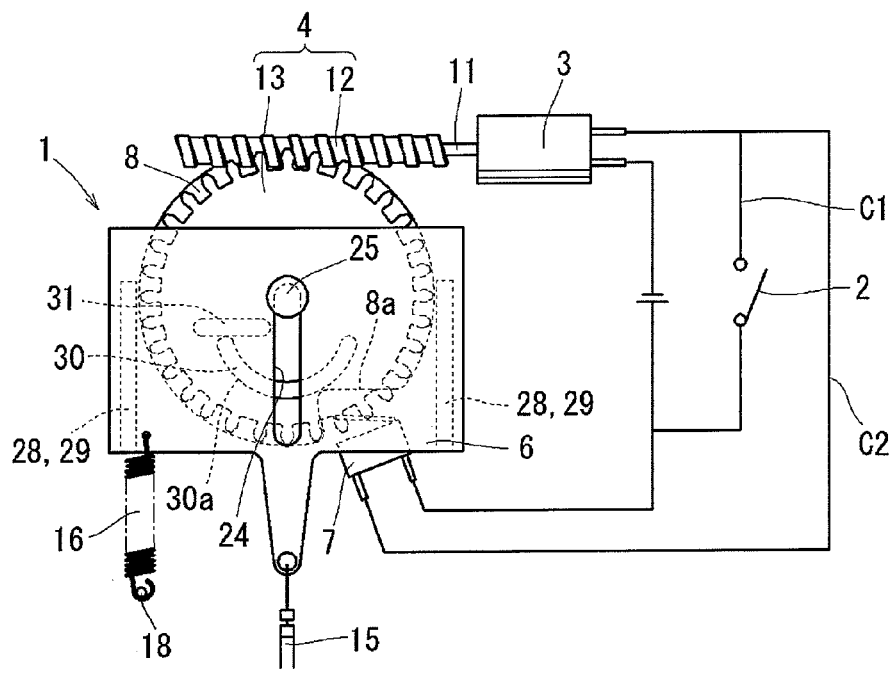
FIG. 11 is a plan view of the lock releasing mechanism according to a second embodiment.

FIG. 11 to FIG. 14 show a second embodiment. The second embodiment is an example in which converting means, that is, pressing means and receiving means are modified. More specifically, as shown in FIG. 11, which is a plan view showing the initial state of the lock releasing mechanism 1 according to the second embodiment, in which a pressing projection 30 by itself is formed into an arcuate shape having a certain length in the circumferential direction, and the outer peripheral surface thereof in the radial direction is formed into an arcuate surface 30a. The point that the radius of curvature thereof is the same as the base gear 13 is the same as the arcuate surface 20a in the first embodiment. In contrast, a receiving projection 31 which comes into abutment with the pressing projection 30 is formed on the lower surface of the slider 6 as a deviated position so as to project in an elongated strip shape.

Figure 12:
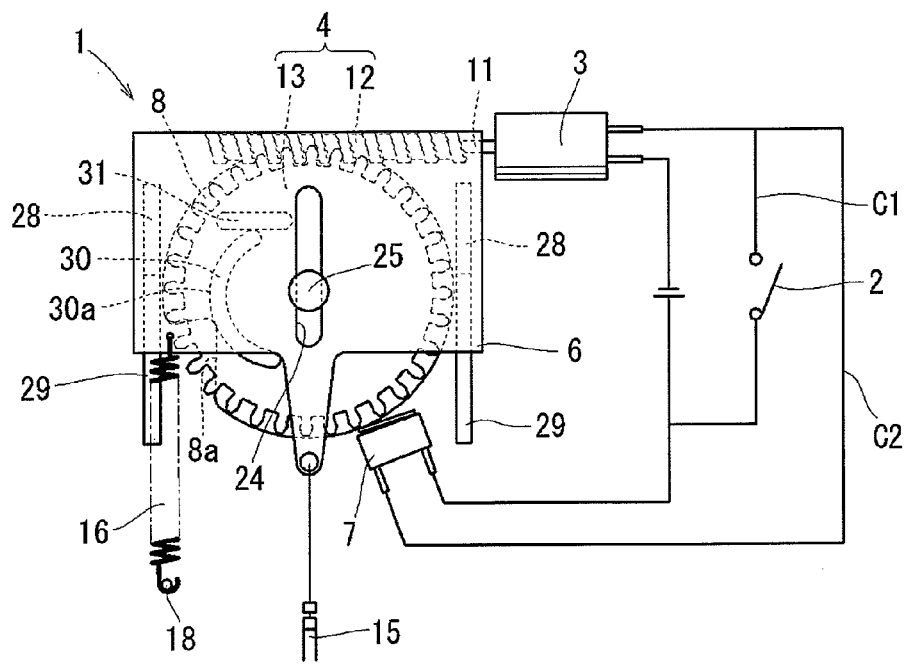
FIG. 12 is a plan view of a state in which the slider according to the second embodiment is at the full-stroke position.
Figure 13:
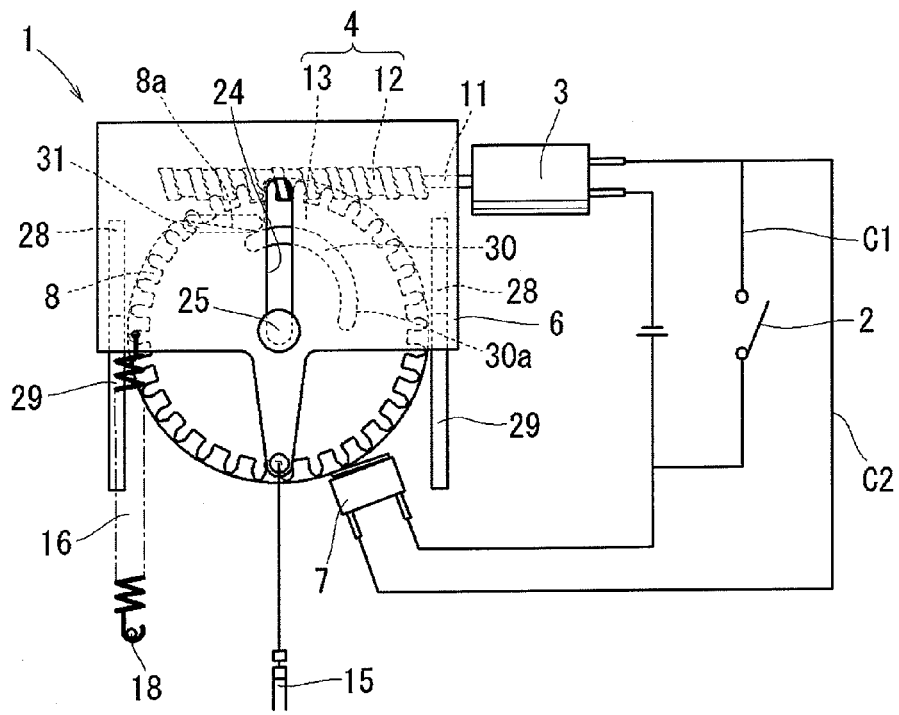
FIG. 13 is a plan view of a state in which the slider according to the second embodiment is retained at the full-stroke position.
Figure 14:
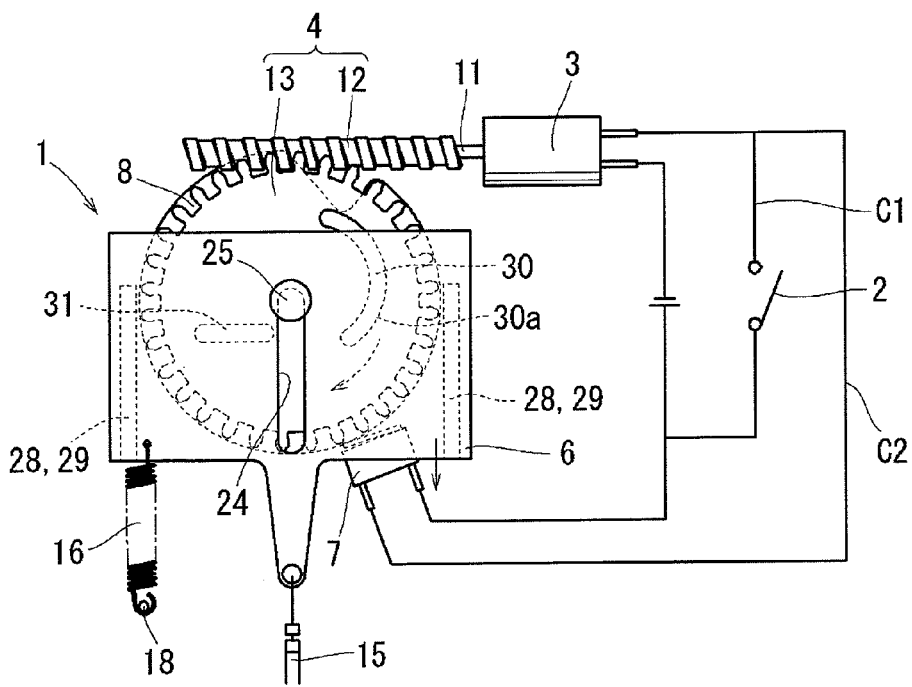
FIG. 14 is a plan view of a state in which the slider according to the second embodiment is returned to the neutral position.

The lock releasing mechanism 1 according to the second embodiment is also the same actuating mechanism as in the first embodiment. More specifically, when the current passing operation is performed via the main switch 2 in the initial state shown in FIG. 11, the receiving projection 31 is pressed by the pressing projection 30 in association with the rotation of the base gear 13 which receives the output of the motor 3, while the slider 6 is displaced and slides from the neutral position to the full-stroke position. Then, as shown in FIG. 12 and FIG. 13, the slider 6 is retained at the full-stroke position while the arcuate surface 30a of the pressing projection 30 is in sliding contact with the receiving projection 31. When the pressing projection 30 is further rotated beyond the receiving projection 31, and the pressing projection 30 and the receiving projection 31 are brought into a non-contact state as shown in FIG. 14, the pressing force of the pressing projection 30 is released, and the slider 6 is displaced to the neutral position by the urging force of the cable 15 and the neutral spring 16. Finally, when the plate cam 8 has made one revolution, the limit switch 7 is brought into the current blocking state as shown in FIG. 11, so that the lock releasing mechanism 1 is automatically stopped. Since other points are the same as the first embodiment described above, the members are designated by the same reference numerals and the description will be omitted.

Third Embodiment

Figure 15:
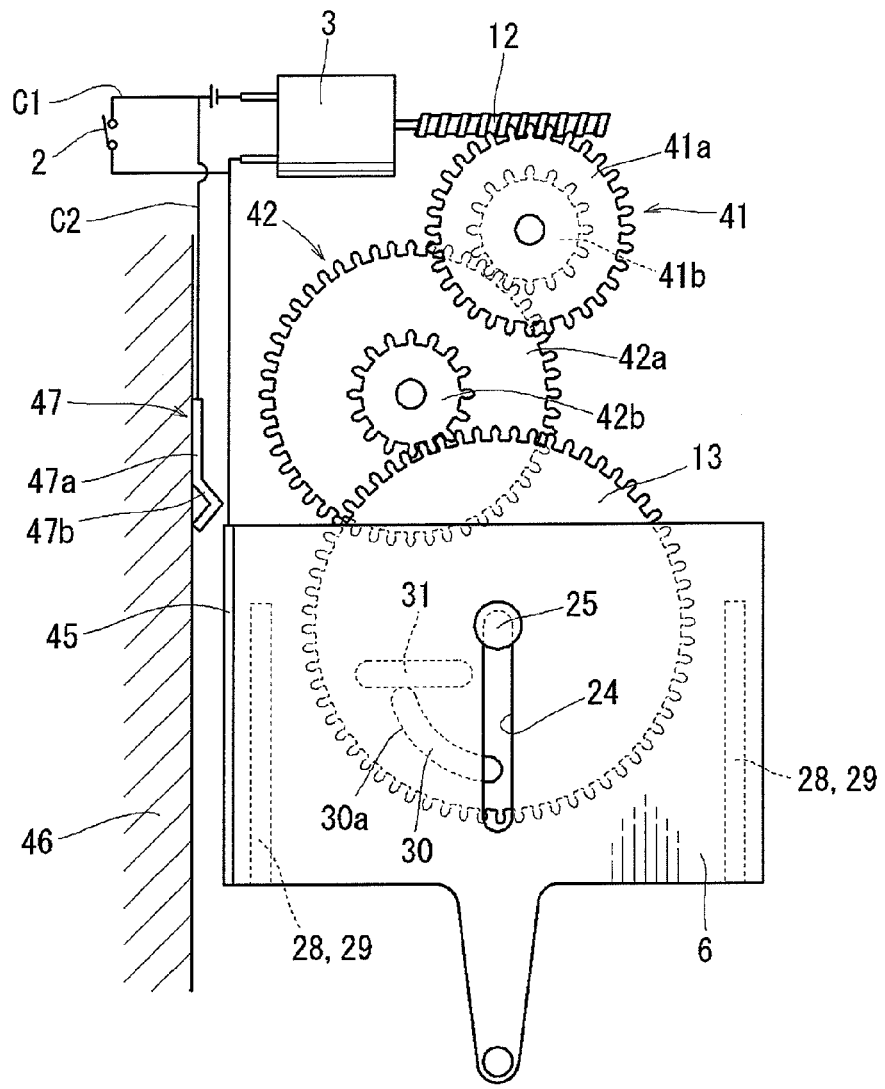
FIG. 15 is a plan view of the lock releasing mechanism according to a third embodiment.

In the first embodiment or the second embodiment, the worm gear 12 and the base gear 13 of the motor 3 are meshed directly with each other. However, one or a plurality of transmission gears may be interposed between the worm gear 12 and the base gear 13 in order to change the rotating speed of the base gear 13. FIG. 15 shows a third embodiment as an example of the lock releasing mechanism 1 in which the transmission gear is interposed between the worm gear 12 and the base gear 13. In the third embodiment, the rotating speed of the base gear 13 is reduced by interposing two first and second transmission gears 41, 42 between the worm gear 12 and the base gear 13. More specifically, the worm gear 12 and a large diameter portion 41a of the first transmission gear 41 mesh with each other, a small diameter portion 41b of the first transmission gear 41 and a large diameter portion 42a of the second transmission gear 42 mesh with each other, and a small diameter portion 42b of the second transmission gear 42 and the base gear 13 mesh with each other. In association with the reduction of the rotating speed of the base gear 13, the rotating speed of the pressing projection 30 which rotates synchronously therewith is also reduced. Accordingly, the duration of sliding contact between the arcuate surface 30a of the pressing projection 30 and the receiving projection 31 is increased, and the period in which the slider 6 is retained at the full-stroke position can be increased correspondingly. Also in a case of setting the duration equivalent to the full-stroke position retaining time in the first embodiment or the second embodiment, the circumferential length of the arcuate surface 30a can be reduced. In the third embodiment, the period in which the slider 6 is retained at the full-stroke position is designed to be longer than a period (on the order of three to four seconds) required for operating the seatback 102 of the power seat 100 from a full-stroke posture to the basic posture in a lock zone L (see FIG. 1). In this manner, the transmission gear mechanism includes the transmission gears 41, 42 and the base gear 13, and when the worm gear 12 is added thereto, a conversion gear mechanism is achieved.

In the third embodiment, the configuration of the limit switch is also changed. More specifically, it includes a metallic plate 45 arranged on one side surface of the slider 6 and a metallic strip 47 arranged on a side wall of a casing 46 which surrounds the lock releasing mechanism 1 without using the plate cam. The metallic strip 47 on the side of the casing 46 includes a plate portion 47a and an angled portion 47b, and is bonded to the side surface of the casing 46 via the plate portion 47a. The metallic plate 45 is an elongated plate member bonded to one side surface of the slider 6. The metallic plate 45 and the metallic strip 47 are coupled to the motor 3 via electric cables which form the circuit C2, respectively. As shown in FIG. 14, when the slider 6 is at the neutral position, the metallic plate 45 and the metallic strip 47 are apart from each other with the intermediary of a small gap therebetween. In contrast, when the current passing operation is performed via the main switch 2 and the slider 6 is displaced toward the full-stroke position, the metallic plate 45 and the angled portion 47b of the metallic strip 47 come into contact with each other and hence the circuit C2 is brought into the current passing state. In other words, the metallic plate 45 and the metallic strip 47 serve as terminal of the limit switch. When the slider 6 makes one reciprocating motion, and is returned to the neutral position again, the metallic plate 45 and the metallic strip 47 come apart from each other, and the current passing in the circuit C2 is blocked, so that the motor 3 is automatically stopped. In the third embodiment, since the slider 6 can be shifted from the full stroke position to the neutral position only by the urging force from the cable 15, the return spring is not used. As other points are the same as in the second embodiment, the same members are designated by the same reference numerals and the description will be omitted.

Fourth Embodiment

Figure 16:
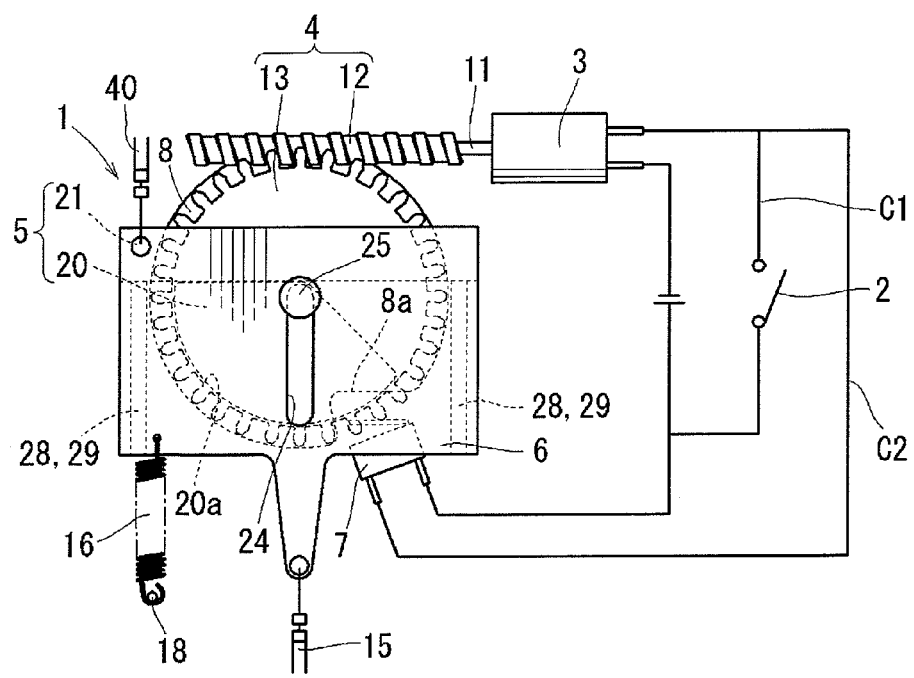
FIG. 16 is a plan view of a state in which the slider according to a fourth embodiment is at the initial position.
Figure 17:
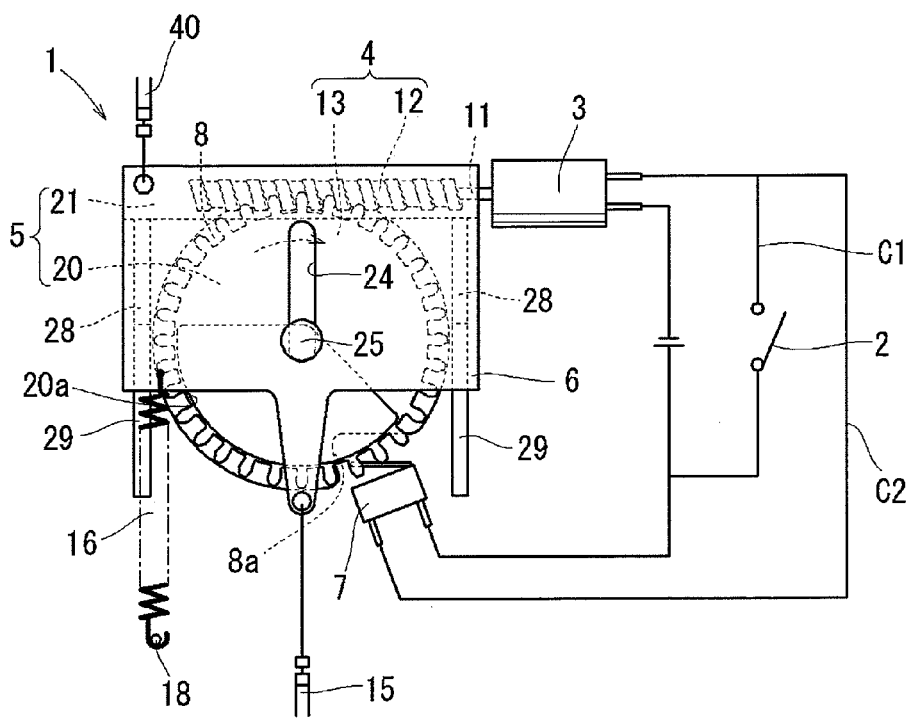
FIG. 17 is a plan view of a state in which the slider according to the fourth embodiment is at the full-stroke position.

Although the mechanism is configured to tow the cable 15 coupled to the locking mechanism only electrically in the first to third embodiments, a configuration of towing selectively manually as well as electrically can also be employed. More specifically, it is achieved by coupling another cable different from the cable 15 to the slider 6, and towing the cable manually to slide the slider 6 to the full-stroke position. For example, a fourth embodiment in which a manual cable 40 for manually towing is applied to the lock releasing mechanism 1 in the first embodiment is shown in FIG. 16 to FIG. 17. In other words, the fourth embodiment is a modification of the first embodiment. Although the basic structure of the fourth embodiment or the electric lock releasing mechanism and the like are the same as those in the first embodiment, it is different in that the locked state of the locking mechanism can be released by manually towing the cable 15 in addition thereto. The manual cable 40 corresponds to a towing member.

Figure 18:
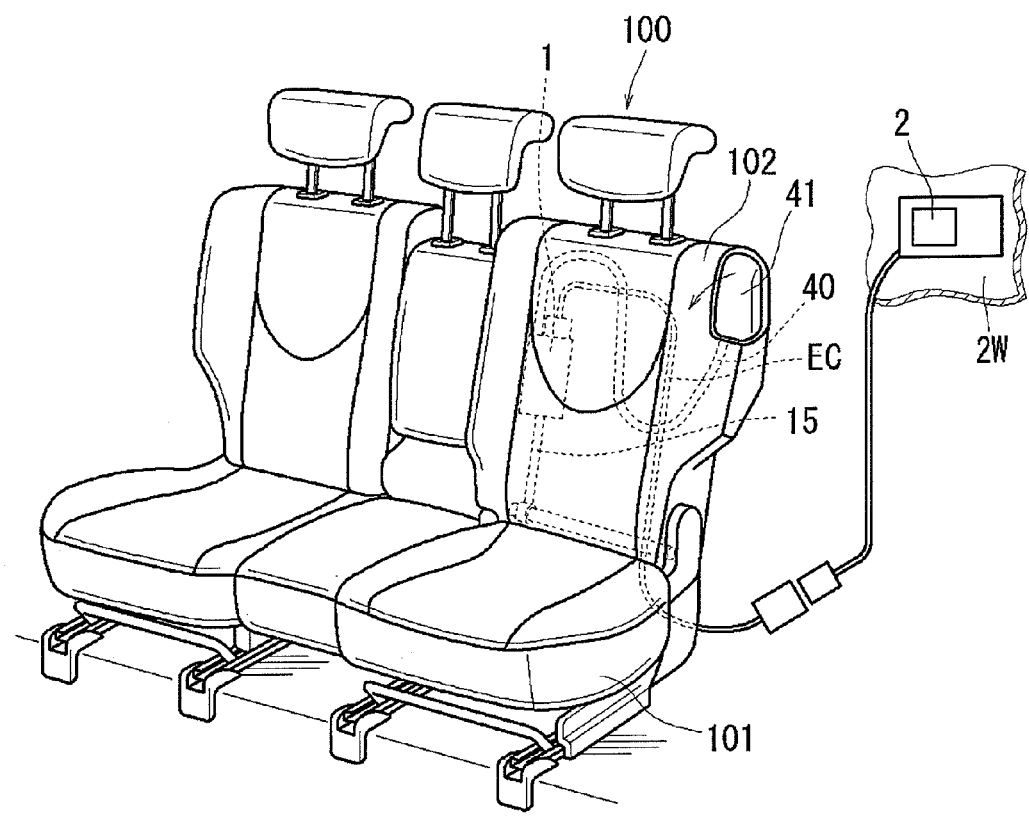
FIG. 18 is a perspective view of the vehicle seat showing an example of arrangement of a lever member for towing a manual cable.

As shown in FIG. 16, one end of the manual cable 40 is coupled to an edge of the slider 6 opposing the portion where the cable 15 is coupled (the edge on the side opposite from the towing direction of the cable 15). The manual cable 40 is preferably coupled so as not to be overlapped with the conversion gear mechanism 4 including the worm gear 12 and the base gear 13 of the motor 3. The other end of the manual cable 40 may be coupled to a lever member 41 rotatably supported by a shoulder portion or the like of the seatback 102 for example as shown in FIG. 18. The main switch 2 may be provided on a vehicle inner wall 2W as well as on the outside of the seat cushion 101. The reference sign EC designates a power code for electrically coupling the motor 3 and the main switch 2. Then, when the lever member 41 is rotated to manually tow the manual cable 40 without performing the current passing operation via the main switch 2, the slider 6 slides from the initial position shown in FIG. 16 to the full-stroke position shown in FIG. 17 correspondingly. Accordingly, the cable 15 is towed and the locked state of the locking mechanism is released. At this time, the gear mechanism such as the base gear 13 and the converting means are not rotated. By releasing the towing operation by the manual operation of the manual cable 40, the slider 6 is returned to the neutral position by the urging force of the cable 15 and the neutral spring 16.

In this manner, according to the fourth embodiment, the locked state of the locking mechanism can be selectively released electrically or manually. Then, the manual unlocking is performed without being associated with the rotation of the base gear 13 or the like, the possibility of occurrence of the reverse rotation of the motor 3 due to the rotation of the base gear 13 is minimized. Therefore, according to the fourth embodiment, a countermeasure for a counter-electromotive force in association with the reverser rotation of the motor 3 is not necessary, so that the simple configuration in which the member for preventing the counter-electromotive force is omitted is achieved. Since other points are the same as the first embodiment described above, the members are designated by the same reference numerals and the description will be omitted.

Other Embodiments

Although the modification of the converting means in the lock releasing mechanism has mainly been described above, the cam mechanisms in the first embodiment and the second embodiment may be configured by a projection projecting radially outwardly from part of the outer peripheral surface of the plate cam. In this case, in contrast to the first embodiment and the second embodiment, when the plate cam is in the initial state, the plate cam and the limit switch are in contact with each other, and the plate cam and the limit switch are arranged to be apart from each other while the plate cam is rotating.

Although the third embodiment has been described as the modification of the second embodiment, the first embodiment may be implemented similar to the third embodiment. The circumferential length of the arcuate surface of the pressing projection may be changed variously as needed according to the number of rotation of the base gear or the period of retaining the slider at the full-stroke position, it is preferably on the order of 1/12 circle (an angle of 30°) to ½ circle (an angle of 180°). When the length of the arcuate surface is smaller than 1/12 circle (a center angle of 30°), the retaining period at the full-stroke position becomes too short. If it is larger than ½ circle (a center angle of 180°), the sliding amount (stroke) of the slider becomes too small.

Although the transmission gear mechanism is configured to reduce the rotating speed of the base gear, in the third embodiment it may be configured to increase the rotating speed of the base gear depending on the case. The metallic plate and the metallic strip which serve as the terminals of the limit switch may be arranged in the opposite relation from that in the third embodiment.

The pressing projection, the receiving projection, and the plate cam may be formed separately from the base gear and the slider, and may be fixed respectively by bonding, screwing, or fitting to the fixed hole. Also, the pressing means and the receiving means may be formed on part of the base gear or the slider as the pressing portion or the receiving portion formed as a depression or in a staircase pattern. By changing the radius of the rotation locus circle of the pressing means as needed, the amount of sliding shift of the slider can be adjusted as needed. In other words, the amount of sliding shift of the slider may be increased by increasing the radius of the rotation locus circle of the pressing means and, in contrast, the amount of slide shift of the slider may be reduced by reducing the radius of the rotation locus circle of the pressing means.

It is also possible to couple the manual cable 40 to the lock releasing mechanism in the second embodiment or the third embodiment and allow unlocking by selectively towing the cable 15 not only electrically, but also manually.

What is claimed is:

1. A lock releasing mechanism coupled to a locking mechanism via a coupling member and configured to be capable of releasing a locked state of the locking mechanism by electrically towing the coupling member, comprising:
    a main switch configured to perform a current passing operation manually when releasing the locked state of the locking mechanism;
    a motor configured to generate a rotation output by being supplied with a power source by the current passing operation via the main switch;
    a conversion gear mechanism including a worm gear fixed to a rotating shaft of the motor and a base gear meshed with the worm gear and configured to convert a direction of rotation output of the motor;
    a converter that converts a rotating motion to a reciprocating linear motion upon receipt of a conversion output from the conversion gear mechanism, the converter including a presser and a receiver, the presser being configured to rotate integrally with the base gear about the same center of rotation and to releasably contact the receiver to apply a pressing force thereto, the receiver being configured to move integrally with a reciprocating member upon receipt of the pressing force of the presser;
    the reciprocating member is coupled to the coupling member and configured to linearly reciprocate between two positions of a neutral position in which the locking mechanism is in a locked state, and a full-stroke position in which the coupling member is towed to release the locked state of the locking mechanism by the converter;
    a cam mechanism configured to rotate integrally and coaxially with the base gear, the cam mechanism including an outer peripheral surface and a depression defined thereon; and
    a limit switch configured to be able to pass a current to the motor by a parallel circuit different from a current passage circuit of the main switch, wherein
    in a current blocking state, the reciprocating member is at the neutral position and the limit switch is separated from the cam mechanism by the depression, and in a current passing state, the limit switch contacts the cam mechanism while the reciprocating member makes one reciprocating motion between the two positions by the current passing operation via the main switch, and
    the reciprocating member is retained for a predetermined period at the full-stroke position while the reciprocating member makes one reciprocating motion between the two positions by the converter.

2. The lock releasing mechanism according to claim 1, wherein the reciprocating member moves from the neutral position to the full-stroke position by the receiver being pressed in association with the rotation of the presser, and the reciprocating member returns from the full-stroke position to the neutral position when the pressing force of the presser is released; and
    a radially outer peripheral surface of a rotation locus of the presser is formed as a circular articulate surface concentric with the base gear, and the reciprocating member is retained at the full-stroke position for a predetermined period while the arcuate surface of the presser is in sliding contact with the receiver.

3. The lock releasing mechanism according to claim 2, wherein the cam mechanism is configured to perform the current passing operation with respect to the limit switch by coming into and out of contact with the limit switch, and
    the limit switch is brought into the current passing state only while the cam mechanism makes one revolution upon receipt of the rotation output of the motor by the current passing operation via the main switch.

4. The lock releasing mechanism according to claim 3, wherein the cam mechanism is configured to come into partial abutment with the limit switch such that the limit switch and a part of the cam mechanism are brought into abutment,
    when the limit switch and the cam mechanism are brought apart from each other in the neutral state before causing the main switch to perform the current passing operation, the limit switch is in the current blocking state, and
    when the limit switch and the cam mechanism are moved apart from each other to assume the current passing state, and when the limit switch and a part of the cam mechanism are brought into abutment with each other to assume the current passing state, the cam mechanism is rotated upon receipt of the output of the motor by the current passing operation via the main switch.

5. The lock releasing mechanism according to claim 4, wherein the locking mechanism is provided with an electric reclining mechanism for use in a power seat for a vehicle, the electric reclining mechanism including an operating member configured to be rotatably towed by the coupling member between a locked position and an unlocked position to adjust a reclining angle, wherein the coupling member is a cable coupling the rotatable operating member of the electric reclining mechanism to the locking mechanism, and the reciprocating member is retained at the full-stroke position for a period at least longer than that required for electrically operating the power seat from a fully reclined state to a free lock state.

6. The lock releasing mechanism according to claim 5, wherein a towing member being capable of towing the reciprocating member manually to the full-stroke position is coupled to the reciprocating member; and the coupling member is configured to be selectively towed electrically and manually.

7. The lock releasing mechanism according to claim 6, wherein the towing member is coupled so as not to be overlapped with the conversion gear mechanism.

* * * * *